United States Patent [19]

Blain et al.

[11] Patent Number: 4,897,087
[45] Date of Patent: Jan. 30, 1990

[54] DIISOCYANATE DERIVATIVES AS ASHLESS FUEL DISPERSANTS AND DETERGENTS AND FUEL COMPOSITIONS CONTAINING SAME

[75] Inventors: David A. Blain, Morrisville, Pa.; Angeline B. Cardis, Florence; Jeffrey C. Trewella, Mullica Hill, both of N.J.

[73] Assignee: Mobil Oil Corporation, New York, N.Y.

[21] Appl. No.: 277,738

[22] Filed: Nov. 30, 1988

[51] Int. Cl.[4] ............................ C10L 1/18; C10L 1/22
[52] U.S. Cl. ............................................ 44/71; 44/73
[58] Field of Search ................................................ 44/71

[56] References Cited

U.S. PATENT DOCUMENTS

| 3,366,569 | 1/1968 | Norman et al. | 44/71 |
| 3,785,789 | 1/1974 | Honnen et al. | 44/71 |
| 3,844,965 | 10/1974 | Brown | 252/51.5 A |
| 3,951,614 | 4/1976 | Honnen et al. | 44/71 |
| 4,234,321 | 11/1980 | Lilburn | 44/72 |
| 4,235,730 | 11/1980 | Schlicht | 44/70 |
| 4,261,704 | 4/1981 | Langdon | 44/62 |
| 4,470,828 | 9/1984 | Yamamura et al. | 44/51 |
| 4,524,006 | 6/1985 | Sandel | 44/71 |
| 4,686,055 | 8/1987 | Horodysky | 252/32.7 E |
| 4,696,755 | 9/1987 | Campbell | 252/51.5 R |
| 4,699,724 | 10/1987 | Nalesnik et al. | 252/51.5 A |

Primary Examiner—William R. Dixon, Jr.
Assistant Examiner—Ellen M. McAvoy
Attorney, Agent, or Firm—Alexander J. McKillop; Charles J. Speciale; Howard M. Flournoy

[57] ABSTRACT

Reaction products in which polyethers are connected to polyamines using diisocyanates have been found to be effective ashless dispersants and detergents for fuel.

18 Claims, No Drawings

DIISOCYANATE DERIVATIVES AS ASHLESS FUEL DISPERSANTS AND DETERGENTS AND FUEL COMPOSITIONS CONTAINING SAME

BACKGROUND OF THE INVENTION

The present invention is directed to novel additive products and to their use in liquid hydrocarbon fuels as a means of cleaning and/or retarding the formation of deleterious deposits on certain moving parts of, for example, internal combustion engines. More particularly, the invention is directed to reaction products in which polyethers are connected to polyamines via diisocyanates and to fuel compositions containing same.

With the ever increasing demand for high performance engines to perform over long periods of time, it is necessary that the moving parts of such engines be maintained in as clean a state as possible. Both to prolong the life of the engine and to prolong the life of the vehicle which it propels and to reduce down time and repair of said vehicle. Just to merely maintain satisfactory performance, the moving parts of the engine must not be fouled up or dirty.

Additives are an important means of providing this protection for internal combustion and other similar type engines. As is well known, they may give the fuel compositions new properties or they may enhance properties already present. Nevertheless, the art is constantly seeking new materials to enhance the performance capabilities of these engines.

Products containing both polyether (also known as polyoxyalkylene) and polyamine fragments are known as fuel disperants as disclosed in U.S. Pat. Nos. 4,234,321 and 4,261,704.

U.S. Pat. No. 4,234,321 is directed to additive products produced by reacting certain hydrocarbyl(polyoxyalkylene) alcohols with phosgene and certain polyamines to produce hydrocarbyl polyoxyalkylene ureylene carbamates.

U.S. Pat. No. 4,261,704 is directed to polyoxyalkylene polyamines prepared by first reacting a polyoxyalkylene polyol or a polyoxyalkylene glycol monoether with a halogen-containing compound. The resulting halogenated ether is then aminated by reaction with a mono- or polyamine. The resulting products are substantially monoamine or polyamine derivatives useful as intermediates for preparing cationic surfactants, cationic polymers and also as fuel detergent additives. The dispersants disclosed by these patents are not made using diisocyanates which is a critical aspect of the present invention.

U.S. Pat. No. B 4,696,755 is directed to lubricating oils containing an additive comprising hydroxy polyether amines. U.S. Pat. No. 4,699,724 is directed to additives prepared by coupling two mono-alkenyl succinimides with an aldehyde and a phenol. The above additives may be prepared in a variety of ways. None of these ways uses diisocyanates, however.

U.S. Pat. No. 3,844,965 discloses diisocyanate bridged polyether-polyamines as lubricant dispersants. However, no mention is made of fuel applications or compositions. The above patent mentions $C_{30}$ to $C_{200}$ hydrocarbyl substituted amines whereas the polyamines in our work are described as $C_6$ to $C_{30}$ hydrocarbyl substituted and non-hydrocarbylsubstituted amines.

Using these materials as fuel additives is believed to be novel.

It is accordingly, very desirable for fuel compositions to have detergent/dispersancy additives which effectively control the buildup of deleterious materials in such intake systems of internal combustion engines as the carburetor and valves.

SUMMARY OF THE INVENTION

The present invention provides a novel use of certain additive products of reaction as ashless detergents and dispersants for liquid hydrocarbon fuels. The products are prepared by reacting a suitable diisocyanate with a polyether and then (usually catalytically) reacting the resultant intermediate product with a suitable polyamine to obtain the desired final product. More particularly, this invention is directed to fuel compositions containing a major amount of a liquid hydrocarbon fuel and minor amounts of an additive product comprising a polyether connected to a polyamine via a diisocyanate. These additives impart detergency and dispersancy characteristics to the fuel compositions.

DESCRIPTION OF SPECIFIC EMBODIMENTS

The general procedure of preparing these additive products of reaction is as follows: $C_1$-$C_{60}$ alkyl, aryl, alkaryl, or arylalkyl diisocyanates are first reacted with polyethers in a refluxing inert hydrocarbon solvent. Polyethers can be made from lower olefin oxides such as ethylene, propylene, or butylene oxides with butylene oxide being preferred. The polyether can be mono-capped or not capped. A catalyst, such as triethylamine or diazabicyclooctane, may be used in the reaction. Although any suitable catalyst known in the art may be used. This intermediate product is added at room temperature to a polyamine dissolved in an inert hydrocarbon solvent. Any suitable inert hydrocarbon solvent may be used. However, toluene or a similar hydrocarbon solvent is preferred. The overall reaction is as generally shown below:

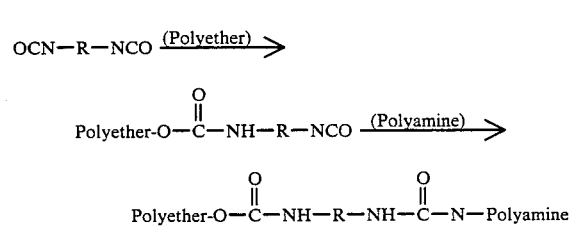

Where R is an alkyl, aryl, alkaryl, or arylalkyl group from about 1 to about 60 carbon atoms.

The polyamine portion of the molecule can contain any primary or secondary amine and combinations thereof. For example, diethylene triamine, triethylene tetramine, tetraethylene pentamine, pentaethylene hexamine, and their corresponding propylene amines. These polyamines can be hydrocarbyl-substituted, preferably by $C_6$ to $C_{30}$ aryl or alkaryl groups attached via a Mannich reaction.

Other suitable amines include but are not limted to triamines such as N-oleyl diethylenetriamine, N-soya diethylenetriamine, N-coco diethylene triamine, N-tallow diethylenetriamine, N-decyldiethylenetriamine, N-dodecyl diethylenetriamine, N-tetradecyl diethylenetriamine, N-octadecyl diethylenetriamine, N-eicosyl diethylenetriamine, N-triacontyl diethylenetriamine, N-oleyl dipropylenetriamine, N-soya dipropylenetriamine, N-coco dipropylenetriamine, N-tallow dipropylenetriamine, N-decyl dipropylene triamine, N-dodecyl dipropylenetriamine, N-tetradecyl dipropylenetriamine, N-octadecyl dipropylenetriamine, N-eicosyl dipropylenetriamine, N-triacontyl dipropylenetriamine, the corresponding N-$C_{10}$ to $C_{30}$ hydrocarbyl dibutylenetriamine members as well as the corresponding mixed members, as for example, the N-$C_{10}$ to $C_{30}$ hydrocarbyl dibutylenetriamine members as well as the corresponding mixed members, as for example, the N-$C_{10}$ to $C_{30}$ hydrocarbyl ethylenepropylenetriamine, N-$C_{10}$ to $C_{30}$ hydrocabyl ethylenebutylenetriamine and N-$C_{10}$ to $C_{30}$ hydrocarbyl propylenebutylenetriamine.

Some typical examples of suitable isocyanates include but are not limited to 2,4-tolylene diisocyanate, 4,4'-diphenyl diisocyanate, 4,4'-diphenyl methane diisocyanate, dianisidine diisocyanates, 1,5-naphthalene diisocyanate, 4,4'-diphenyl ether diisocyanate, p-phenylene diisocyanate, trimethylene diisocyanate, tetramethylene diisocyanate, tetramethylxylene diisocyanate, trimethylhexamethylene diisocyanate, hexamethylene diisocyanate, ethylene diisocyanate, cyclohexylene diisocyanates, nonamethylene diisocyanate, octadecamethylene diisocyanate, 2-(dimethylamino) pentylene diisocyanate, tetrachlorophenylene-1,4-diisocyanate, 3-heptene diisocyanate, transvinylene diisocyanate, and isophorone diisocyanate, preferred is isophorone diisocyanate.

The polyether is generally added to the diisocyanate in a 1:1 ratio. The adduct is added to the polyamine in a ratio of 1:1 to X:1, where X is the number of nitrogens on the polyamine.

In general any suitable liquid fuel or hydrocarbonaceous fuel, more specifically liquid hydrocarbon fuel, is suitable for use in this invention. That particularly includes gasoline motor fuels, both leaded and unleaded, regular as well as high octane. Also intended within this definition are alcohols, gasohol, mixtures thereof and fuel oils and distillates. The concentration necessary for the additive products to be effective depends upon the type of fuel employed and the presence or other absence of the detergents, dispersants and other additives, etc. Generally, the products of this invention can be be added to the fuel in amounts of about 25 lbs. to about 500 lbs. per 1,000 bbls. of fuel.

In gasoline fuels other additives are also generally present such as antiknock agents such as tetramethyl or tretraethyl lead, or other dispersants or detergents. Also included may be lead scavengers, particularly used with additive is a fuel soluble carrier oil.

The following examples are presented to illustrate specific embodiments of this invention and are not to be intepreted as limitations upon the scope thereof.

EXAMPLES

Example 1

440.8 grams (2.0 mol.) of nonylphenol and 103.2 grams (1.0 mol.) diethylene triamine were charged to a 1 liter reactor equipped with an $N_2$ inlet, mechanical stirrer, thermometer, and Dean Stark trap. The mixture was heated to 70° C. under a blanket of $N_2$. A total of 63.0 grams (2.1 mol.) of paraformaldehyde was added in four equal portions over 90 minutes. The mixture was heated to 110° C. for two hours and about 24 milliliters of water were collected in the Dean Stark trap. A further 12 milliliters of water were collected upon stripping the mixture under house vacuum (~250-300 mmHg) at 110° C. for two hours. The resulting viscous material was purified by hot filtration through celite.

Example 2

The procedure of Example 1 is followed to prepare the Mannich base with the following exception: tetraethylene pentamine is substituted for diethylene triamine.

Example 3

13.3 grams (0.06 mol.) isophorone diisocyanate, 130.8 grams (0.06 mol.) mono-capped polybutylene oxide, 0.1 gram (0.001 mol.) diazabicyclooctane and 100 milliliters toluene were charged to a 500 milliliter reactor equipped with an $N_2$ inlet, mechanical stirrer, thermometer, and water-cooled condenser. The solution was refluxed for 24 hours. This product was transferred to an addition funnel and was added dropwise at room temperature to a reactor containing 5.7 gram (0.03 mol.) tetraethylene pentamine (TEPA) in 100 milliliters toluene. The reaction was stirred an additional 15 minutes at which time IR spectroscopy showed the isocyanate peak at 2250 $cm^{-1}$ to be gone. The product was stripped of solvent under reduced pressure and filtered through celite.

Example 4

The procedure from Example 3 was followed with the following exception: the product from Example 2 was substituted for the TEPA.

Example 5

The procedure from Example 3 was followed with the following exception: triethylene tetramine was substituted for the TEPA.

Example 6

The procedure from Example 4 was followed with the following exception: 2200 MW mono-capped polypropylene oxide was substituted for the polybutylene oxide.

Example 7

The procedure from Example 6 was followed with the following exception: twice the amount of the product from Example 2 was used.

Example 8

The procedure from Example 3 was followed with the following exception: hexamethylene diisocyanate was substituted for the isophorone diisocyanate.

Example 9

The procedure from Example 4 was followed with the following exception: hexamethylene diisocyanate was substituted for the isophorone diisocyanate.

Example 10

The procedure from Example 3 was followed with the following exceptions: hexamethylene diisocyanate was substituted for the isophorone diisocyanate and the product from Example 1 was substituted for the TEPA.

Example 11

The procedure from Example 3 was followed with the following exceptions: tetramethylxylene diisocyanate was substituted for the isophorone diisocyanate.

Example 12

The procedure from Example 4 was followed with the following exceptions: tetramethylxylene diisocyanate was substituted for the isophorone diisocyanate.

Example 13

The procedure from Example 10 was followed with the following exceptions: tetramethylxylene diisocyanate was substituted for the hexamethylene diisocyanate.

Example 14

The procedure from Example 3 was followed with the following exceptions: trimethylhexamethylene diisocyanate was substituted for the isophorone diisocyanate and bis-(3-aminopropyl)piperazine was substituted for the TEPA.

Example 15

The procedure from Example 14 was followed with the following exceptions: two equivalents of (3-aminopropyl)morpholine were substituted for the bis-(3-aminopropyl)piperazine.

Example 16

The procedure from Example 3 was followed with the following exceptions: tolylene diisocyanate was substituted for the isophorone diisocyanate and 1040 MW polypropylene oxide was substituted for the polybutylene oxide.

Example 17

The procedure from Example 16 was followed with the following exceptions: 2200 MW polypropylene oxide was substituted for the 1040 MW polypropylene oxide.

An exemplary compound that is a compound from Example 4 was evaluated by the CRC Carburetor Cleanliness procedure at a dosage of 100 lbs/MB in Phillips J. unleaded fuel. The procedure used is outlined in CRC Report No. 529. The data demonstrated the ability of the products herein described to clean up dirty carburetors.

The performance of the gasoline is judged by the amount of deposits formed on the removable throttle body sleeve as determined by the weight of the deposit present and ratings were on the basis of percent of cleanup.

| Additive | Deposit Wt (mg) | % Cleanup |
|----------|-----------------|-----------|
| None | 21 | — |
| Example 4 | 5 | 76 |

The above results dramatically demonstrate that the compositions of the present invention are highly effective in cleanup and/or keeping carburetors clean.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

We claim:

1. A fuel composition comprising a major amount of liquid fuel and a minor detergency/dispersancy amount of a diisocyanate bridged polyether-polyamine product of reaction prepared by connecting polyethers to polyamines with diisocyanates as generally shown below:

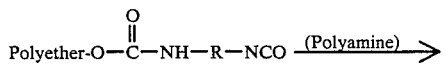

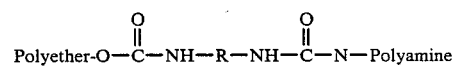

where R is from about 1 to about 60 carbon atoms, and is selected from the group consisting of alkyl, aryl, alkaryl, or arylalkyl, and wherein the polyether is added to the diisocyanate in a 1:1 ratio and the resultant adduct is added to the polyamine in a 1:1 to X:1 ratio and wherein X is the number of nitrogens on the polyamine.

2. The composition of claim 1 wherein said fuel is selected from the group consisting of liquid hydrocarbon fuels, alcohols, gasohol and/or mixtures thereof.

3. The composition of claim 2 wherein said fuel is a liquid hydrocarbon boiling in the gasoline range.

4. The composition of claim 3 wherein said fuel is an unleaded fuel.

5. The composition of claim 1 wherein the polyamine is selected from primary and secondary amines and mixtures thereof.

6. The composition of claim 5 wherein the amine is selected from the group consisting essentially of diethylene triamine, triethylene tetramine, tetraethylene pentamine, pentaethylene hexamine, bis-(3-aminopropyl) piperazine and (3-aminopropyl) morpholine.

7. The composition of claim 6 wherein the amine is selected from the group consisting of corresponding propylene amines.

8. The fuel composition of claim 6 wherein the amine is tetraethylene pentamine.

9. The fuel composition of claim 6 wherein the amine is triethylene tetramine.

10. The composition of claim 1 wherein the diisocyanate is selected essentially from the group consisting essentially of isophorone diisocyanate, hexamethylene diisocyanate, tetramethylxylene diisocyanate, and 2,4-tolylene diisocyanate.

11. The composition of claim 10 wherein the diisocyanate is isophorone diisocyanate.

12. The composition of claim 10 wherein the diisocyanate is tetramethylxylene diisocyanate.

13. The composition of claim 10 wherein the diisocyanate is hexamethylene diisocyanate.

14. The composition of claim 10 wherein the diisocyanate is 2,4-tolylene diisocyanate.

15. The composition of claim 4 wherein the polyamine is hydrocarbyl substituted by a $C_6$ to $C_{30}$ aryl or alkaryl group attached via a Mannich reaction wherein the polyether is added to the diisocyanate in a 1:1 ratio, and the resultant adduct is added to the polyamine in a 1:1 ratio to X:1 ratio and wherein X is the number of nitrogens on the polyamine.

16. The composition of claim 1 wherein the polyethers are made from epoxides selected from the group consisting of ethylene, propylene, or butylene oxide, or mixtures thereof.

17. The composition of claim 16 wherein the epoxide is butylene oxide.

18. The composition of claim 16 wherein the epoxide is propylene oxide.